United States Patent [19]

Duello

[11] Patent Number: 5,097,926
[45] Date of Patent: Mar. 24, 1992

[54] EMERGENCY LUBRICATION MIST SYSTEM

[75] Inventor: Charles L. Duello, Arlington, Tex.

[73] Assignee: Bell Helicopter Textron Inc., Fort Worth, Tex.

[21] Appl. No.: 421,065

[22] Filed: Oct. 13, 1989

[51] Int. Cl.⁵ .............................................. F01M 1/18
[52] U.S. Cl. ................................... 184/6.4; 184/6.11; 184/6.26; 60/39.091
[58] Field of Search ................... 184/6.26, 6.28, 55.1, 184/6.3, 6.4, 6.11; 60/39.08, 39.091

[56] References Cited

U.S. PATENT DOCUMENTS

| | | | |
|---|---|---|---|
| 3,042,462 | 7/1962 | Rosskopf | 184/6.26 |
| 3,779,345 | 12/1973 | Barnes et al. | 184/6.4 |
| 4,284,174 | 8/1981 | Salvana et al. | 184/6.26 |
| 4,390,330 | 6/1983 | Kodama et al. | 184/6.26 |
| 4,717,000 | 1/1988 | Waddington et al. | 184/6.26 |
| 4,856,273 | 8/1989 | Murray | 184/6.4 |
| 4,858,426 | 8/1989 | Holcomb | 60/39.08 |

OTHER PUBLICATIONS

General Electric Training Guide, Richard L. Mabee et al., Sep. 1985.
ASLE Article Entitled "Designing a Mist Oil", T. D. Newingham, vol. 33, 3, 128–132 of Lubrication Engineering 05/10/76.
ASLE Article Entitled "Oil Mist Lubrication", J. R. Gordon, vol. 35, 12, 687–691 of Lubrication Engineering 04/30/79.
ASME Article Entitled "Large Scale Application of Pure Oil Mist Lubrication in Petrochemical Plants", H. P. Bloch, 2/29/80.
ASLE Publication Entitled "Practical Experience with Oil Mist Lubrication", C. A. Towne, 37th Annual Meetin, 5/10–13/82.
Lubrimist brochure entitled "Oil Mist Systems".
"NASA Emergency and Microfog Lubrication and Cooling of Bearings for Helicopters", J. W. Rosenlieb, 8/27/86.

Primary Examiner—Stephen F. Husar
Assistant Examiner—Alan B. Cariaso
Attorney, Agent, or Firm—Richards, Medlock & Andrews

[57] ABSTRACT

An embergency lubrication mist system is operable in response to a drop in oil pressure in a primary lubrication system for components inside a casing. An emergency oil reservoir provides a head of oil for discharge through an air activated misting nozzle sized to dispense an oil in a mist for-fogging the inside of the casing and coating the components inside. The misting nozzle has an air passageway normally closed to a source of air and opening to operate the emergency system in response to a drop of pressure in the primary lubricating system.

13 Claims, 4 Drawing Sheets

EMERGENCY LUBRICATION MIST SYSTEM

This invention was made with Government support under N00019-83-C-0166 awarded by Department of the Navy, Naval Air Systems Command. The Government has certain rights in this invention.

TECHNICAL FIELD OF THE INVENTION

This invention relates to lubrication systems, and, in particular, to an emergency lubrication system operable upon failure of a primary lubricator system for providing a mist of lubrication to create an oil rich atmosphere for components within a housing.

BACKGROUND OF THE INVENTION

Emergency or secondary lubrication systems are well known for providing lubrication to equipment during failure of the primary lubrication system. Sophisticated equipment, such as aircraft, require emergency lubrication systems to lubricate moving parts and to operate for a sufficient period of time to allow continued operation of the equipment. Failure of the primary lubrication system for an aircraft may come from any of a number of events, such as ballistic damage, lubrication pump failure, or loss of lubrication from a system leak.

Several types of emergency or secondary lubrication systems have been used to provide needed lubrication to equipment. Lubricating wicks have been provided for lubricating individual components. Lubrication jets have been provided for individual components along with a small recirculation system. An air aspirated nozzle has been used for delivering a stream of oil to an individual component of the equipment. Further, drip pans have been used as a source of emergency lubrication for equipment.

These existing emergency lubrication systems have disadvantages when emergency lubrication is required for a high number of moving parts which would require a high number of applicators dedicated to these parts, causing an undesirable weight and loss of space for such a system. Failure of any one of such applicators would cause the loss of lubrication for that part, though other parts may receive lubrication. Prior emergency lubrication systems with dedicated applicators require a large volume of oil to provide a stream of oil to each part. Emergency lubrication systems using drip pans are not usable in various tilt attitudes in gear boxes on board aircraft, and the orifices restricted in size for extending the operating time are subject to clogging. Thus, a need has risen for a secondary or emergency lubrication system which overcomes these problems and provides adequate oil to all parts needing lubrication and further, allows the equipment to operate for an extended time period following loss of the primary lube system.

SUMMARY OF THE INVENTION

The emergency lubrication system of the present invention provides a mist or fog of lubrication throughout an enclosed volume containing moving parts requiring lubrication, such as a gear box on board an aircraft. Reservoirs of emergency oil are filled by the primary lubrication system during equipment start up and retained during loss of the primary system. Upon loss of oil pressure in the primary system, air is supplied to one or more misting nozzles directed within the gear box for drawing oil from the reservoirs and for atomizing the oil to fill the gear box and lubricate the moving parts with oil.

The emergency lubrication mist system of the present invention overcomes the disadvantages noted above for prior emergency lubrication systems. The system of the present invention utilizes less oil to lubricate a number of moving parts than prior systems with a nozzle dedicated to each part. A plurality of mist type nozzles as part of the present invention may provide lubrication to a compartmentalized casing or provide redundancy in the event of failure of one of the emergency mister nozzles. The emergency mist lubrication system of the present invention can operate on the oil supply retained in its reservoirs to extend the operating time of the equipment. The system does not require recirculation to achieve extended operation of the equipment.

BRIEF DESCRIPTION OF THE DRAWINGS

For a more complete understanding of the present invention and for further advantages thereof, reference is made to the following Description of the Preferred Embodiment taken in conjunction with the accompanying drawings in which.

DETAILED DESCRIPTION

Figure 1B:
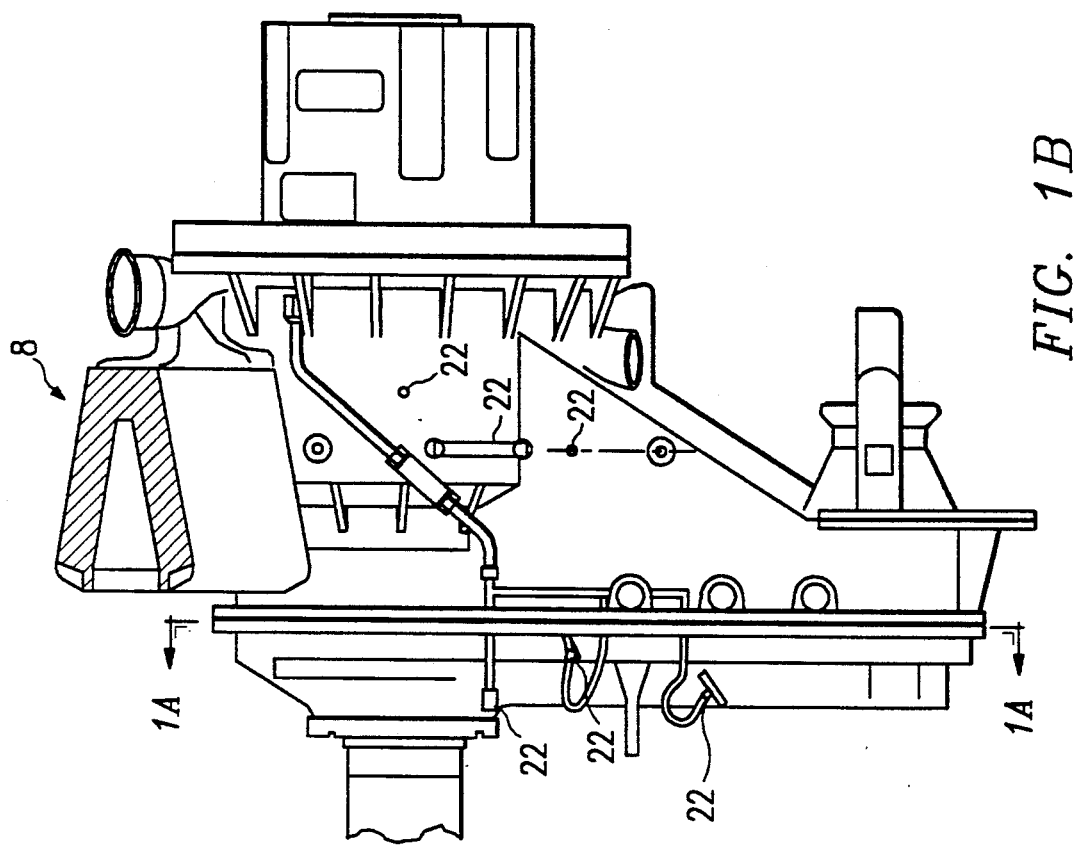
FIGS. 1A and 1B illustrate an aircraft rotor gear box assembly including an emergency mist lubrication system of the present invention.
Figure 1A:
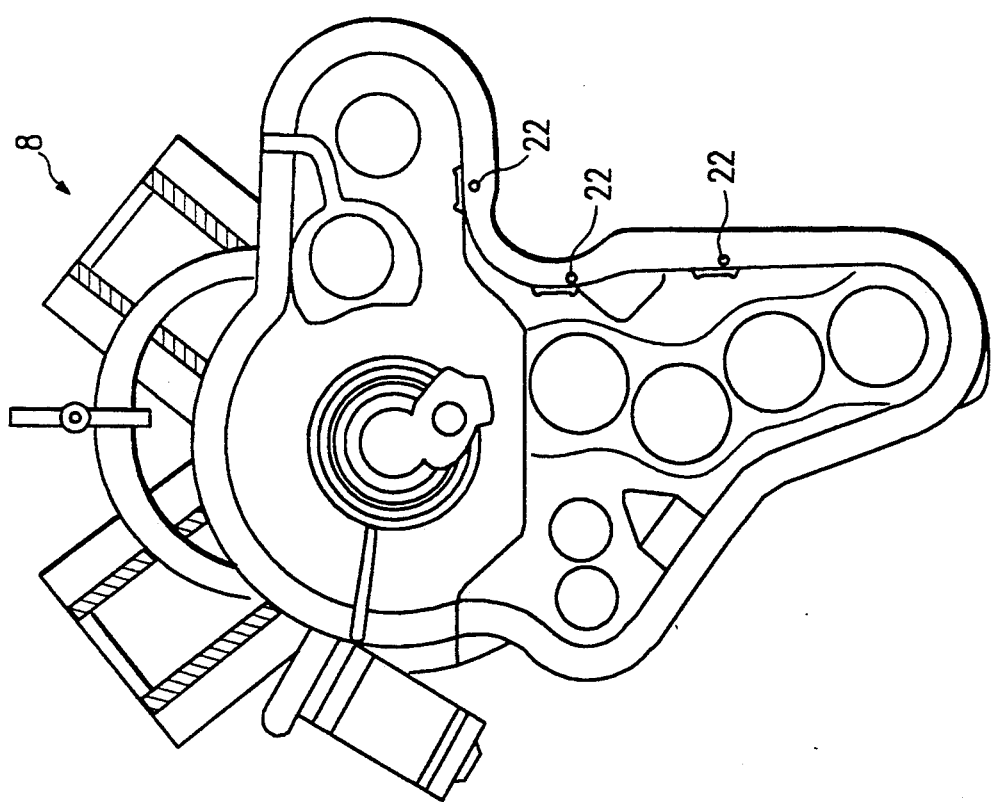

FIGS. 1A AND 1B illustrate a complex prop rotor gear box 8 for a tilt rotor aircraft (not shown) which incorporates the emergency mist lubrication system of the present invention. A plurality of mist nozzles 22 are generally indicated where they are located in the gear box 8. A plurality of misting nozzles 22 are provided as part of the emergency mist system to the prop rotor gear box 8. The compartmentalization of the prop rotor gear box and the size of the gear box and components to be lubricated make it suitable for a plurality of misting nozzles 22. Multiple oil reservoirs 16 (see FIG. 4) are located throughout the gear box 8 and in close proximity to the misting nozzle 22. Due to the dispersion of fine droplets in oil mist 40, oil mist circulates with the movement of the air and the moving components throughout the interior of the gear box 8. The number of misting nozzles 22 create an oil rich atmosphere of fine droplets dispersed by the misting nozzles 22 to provide for redundancy in the system.

Figure 2:
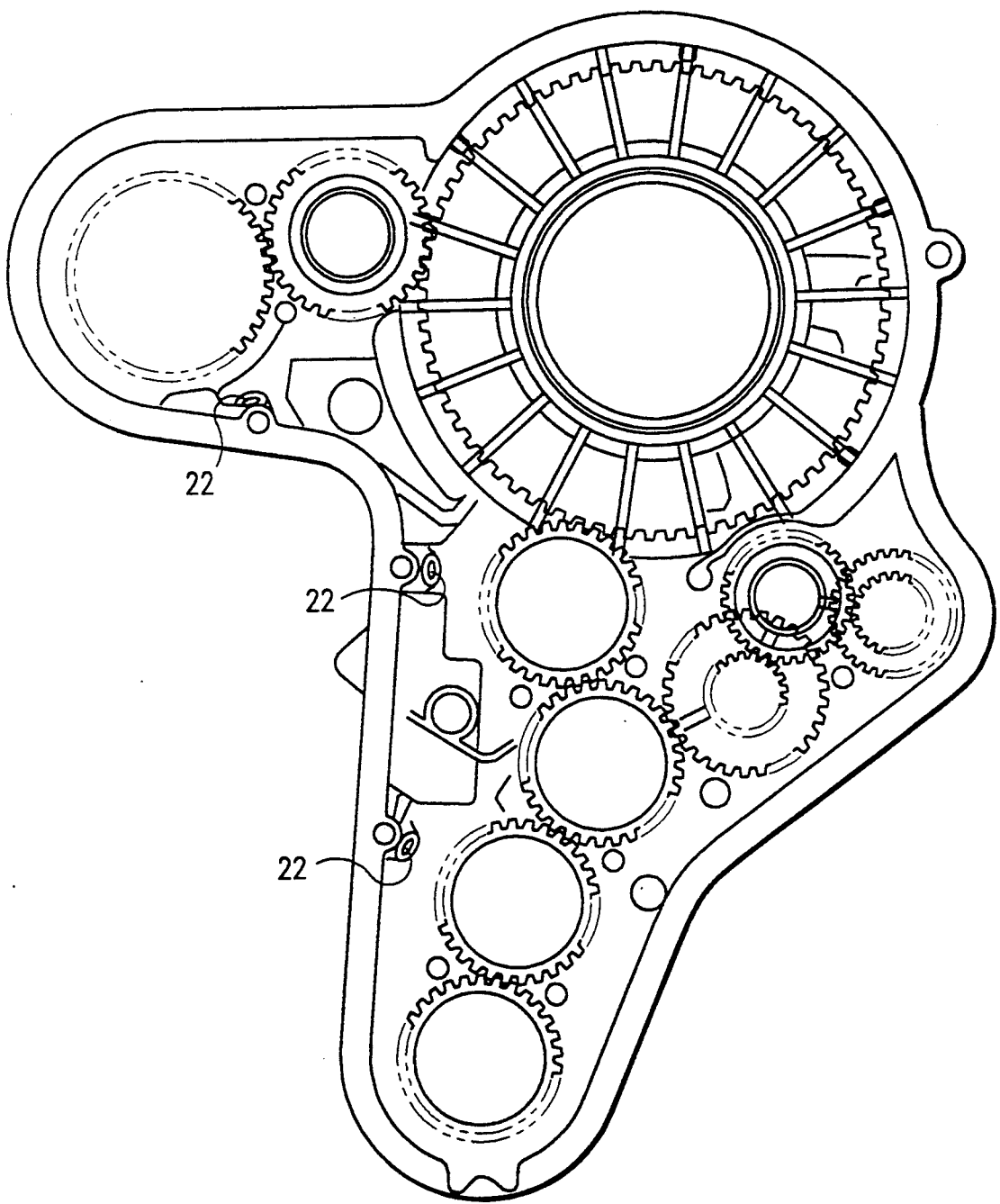
FIG. 2 is a cross-sectional view taken along the line A—A' of FIG. 1B.

FIG. 2 is a cross-sectional view of the gear box 8 taken along the line A—A' of FIG. 1B.

Figure 3:
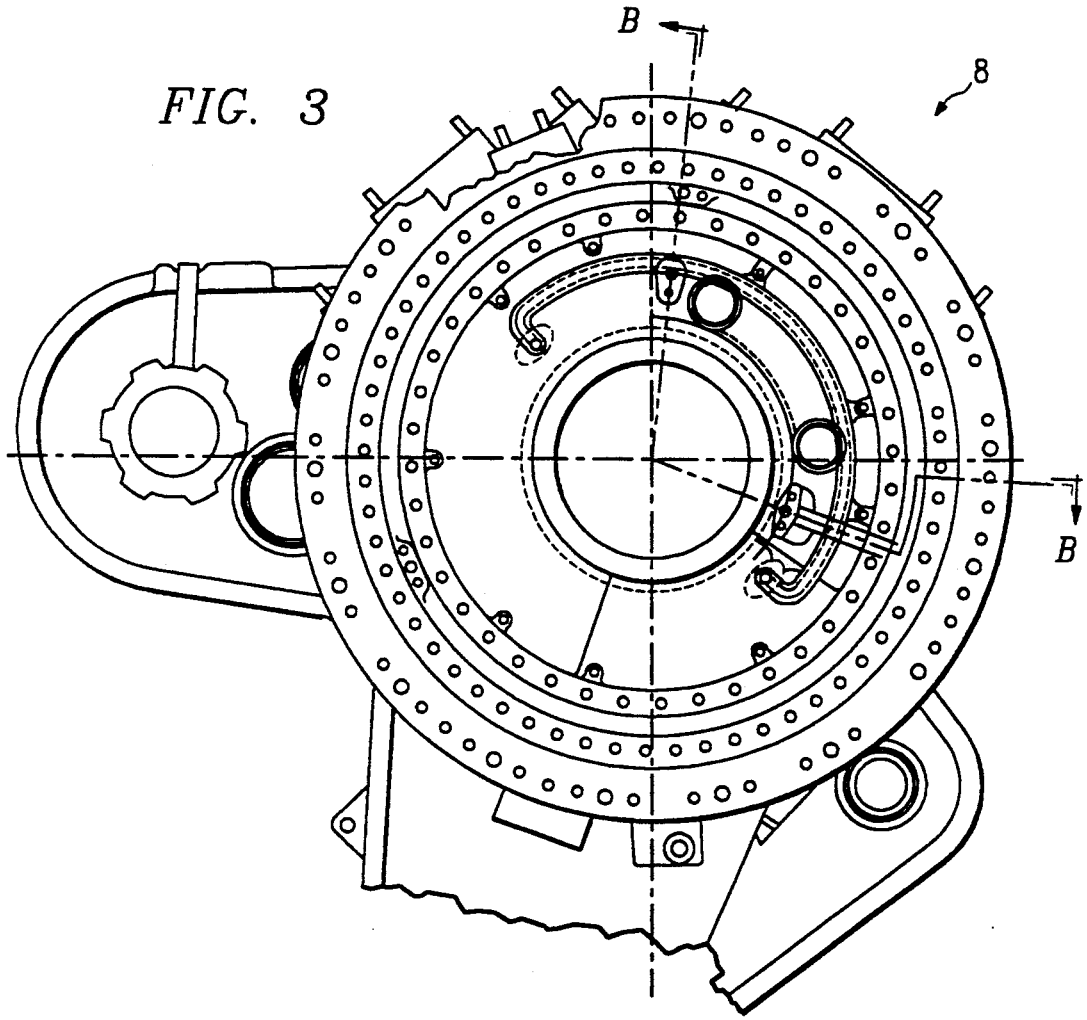
FIG. 3 is a partial plan view of the gear box of FIG. 1.
Figure 4:
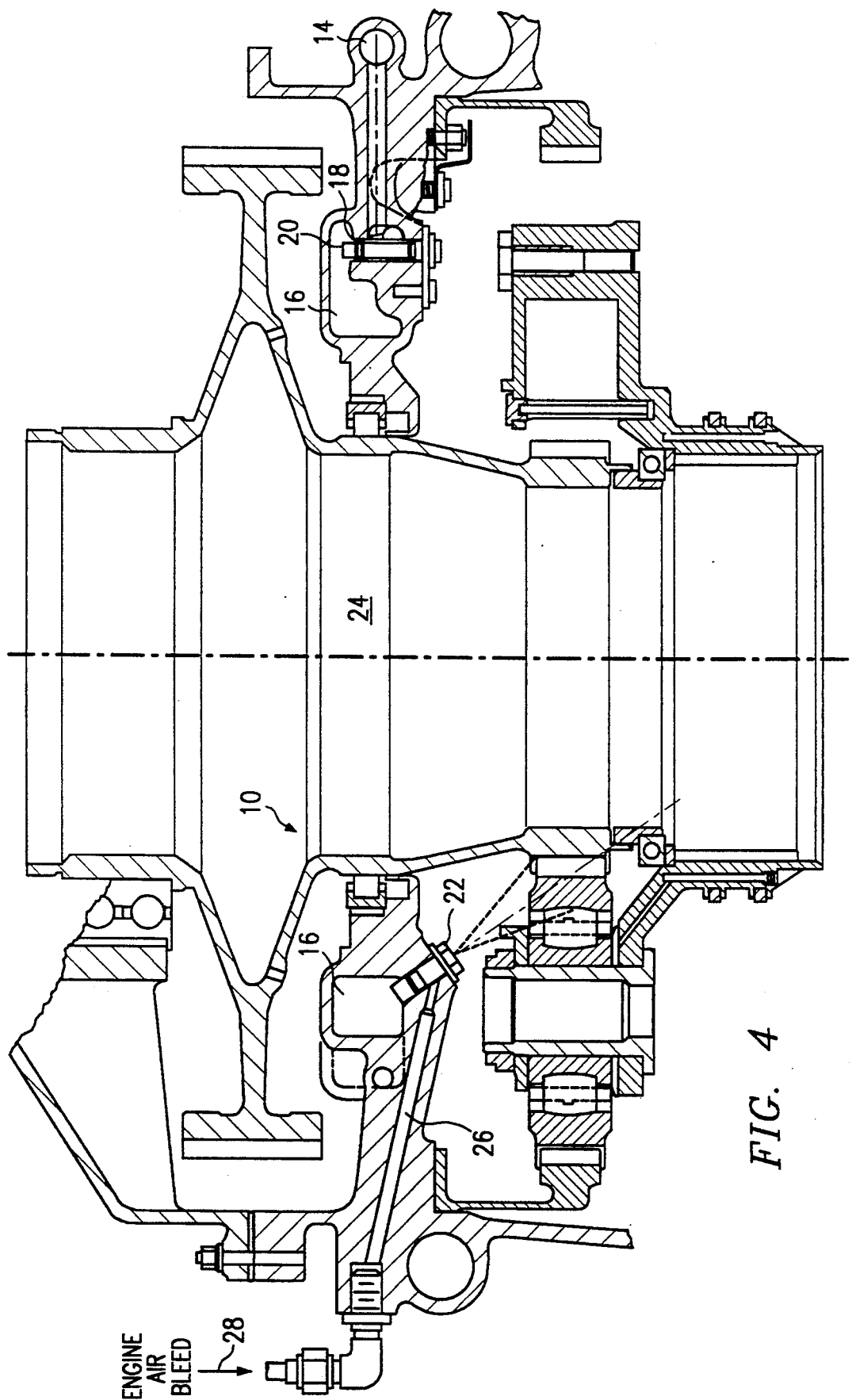
FIG. 4 is a sectional view of the gear box of FIG. 3 taken along the line B—B'.

Referring to FIGS. 3 and 4, FIG. 3 is a partial plan view of gear box 8 and FIG. 4 is an enlarged sectional view taken along line B—B of FIG. 3 to illustrate in greater detail the emergency mist system of the present invention, generally identified by the reference numeral 10.

The emergency mist system 10 provides lubrication to moving parts inside a complex prop rotor gear box 8 for use in a tilt rotor aircraft (not shown). During normal operation, lubricating oil from a main lubricating line 14 fills an emergency oil reservoir 16 built into the gear box 8. An inlet 18 is located at the top of the oil reservoir 16 so that lubricating oil is retained within the reservoir 16 after loss of the primary source of lubrication. A screened restrictor 20 is located at the reservoir inlet 18 to restrict the flow of oil to prevent low oil pressure during engine start up and to provide a filter to prevent any debris from entering the reservoir 16. In one embodiment, the restrictor 20 allows the reservoir 16 to fill up during a period of one minute after engine start up.

A mist nozzle 22 is fitted into the bottom of the reservoir 16 so that oil will drain from the reservoir 16 back into the primary supply during engine shut down. The mist nozzle 22 is positioned to draw oil from the bottom of the reservoir 16 during all intended attitudes of the prop rotor gear box 8 and is located to aim oil mist at critical areas for lubrication so that oil mist will condense on these critical areas as the first component contacted by the oil mist. The oil is dispersed as a mist from the mist nozzle 22 and fills the entire interspace 24 of the gear box 8, producing an oil rich atmosphere. The gears and bearings of the gear box 8 move air through them, causing the gear box components to be lubricated as they move the oil mist inside gear box 8.

The misting nozzle 22 produces a mist under the action of air supplied through a case passage 26 having engine air bleed 28 as the air source. Of course, other suitable air sources could be supplied to the misting nozzle 22 to provide suitable oil mist. As an example, auxiliary compressors on board the aircraft or special compressors added to the aircraft could be used to provide a suitable air source. The introduction of engine air bleed 28 may be manually controlled by the pilot of the aircraft upon receiving indication of low pressure in the primary lubricating system, or the air source may be automatically activated upon predetermined drop of oil pressure in the primary system.

Figure 5:
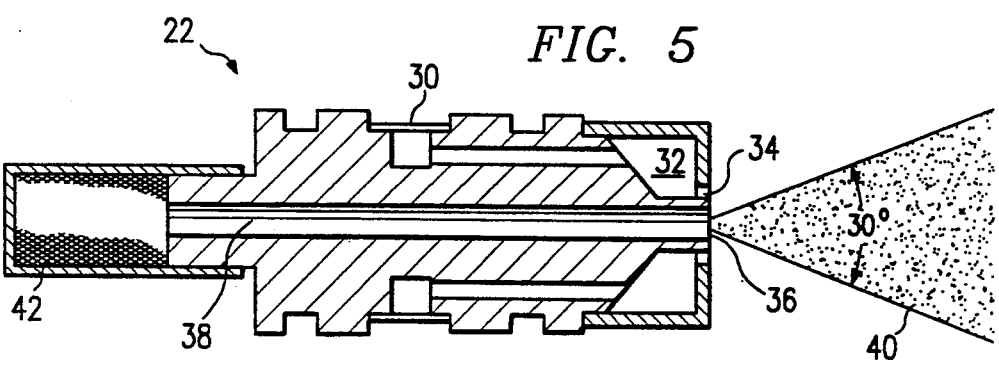
FIG. 5 is an enlarged cutaway view of a misting nozzle used in the emergency mist system of the present invention.

FIG. 5 illustrates a misting nozzle 22 of the emergency mist system 10 of the present invention. The misting nozzle 22 is an air atomizing nozzle operated when air is applied to air inlet 30 which passes to air cap 32 and out the air annulus 34. Air passing out the annulus 34 creates a low pressure region at the opening 36 of the oil feed line 38, drawing oil from the reservoir 16 (not shown) and the oil feed line 38 where it is atomized by the air flow passing through the air annulus 34. As a result, an oil mist 40 of a solid conical pattern of included angle of approximately 30° is provided for fogging the interior of an equipment casing. The size of oil droplets in the mist is in the range of 0.5 to 10 microns in diameter. A final nozzle filter 42 is sized to filter particles in the reservoir 16 from reaching the orifice 36. The design of the misting nozzle 22 is important to the operation of the emergency mist system 10. The air annulus 34 is sized small enough to maintain low air flow of approximately 0.05 lb./min. The misting nozzle operates at 7 p.s.i.g., a relatively low pressure. The orifice 36 of the oil feed 38 is sized to provide 25 inches$^3$/hour of oil flow under nominal operating conditions of the mist system 10. The oil flow rate will vary with the oil inlet 18 head. The oil flow rate of misting nozzle 22 varies from 10 to 40 inches$^3$/hour while the inlet head varies from −2.0 to +10.0 inches of oil in one embodiment of the system 10.

While the present invention has been described with respect to a specific embodiment thereof, various changes and modifications may be suggested to one skilled in the art, and it is intended that the present invention encompass such changes and modifications as fall within the scope of the appended claims.

I claim:

1. An emergency mist lubrication system for lubricating moving components housed within a casing, upon a drop in oil pressure in a primary lubrication system for lubricating the moving components, comprising:
   an oil reservoir for holding a supply of lubricating oil;
   means for filling said oil reservoir from the primary lubrication system;
   means for metering the flow of oil from the primary lubrication system to said oil reservoir such that the primary lubrication system does not experience pressure drop during start-up; and
   an oil mist nozzle having an oil passageway formed therethrough for receiving oil from said oil reservoir at one end and discharging an oil mist at an orifice formed at the other end, said nozzle having an air passageway open at one end located at said other end of said nozzle and having at the other end a normally closed connection to a source of air, such that when said nozzle is activated by opening said air passageway connection to the source of air, an oil mist is dispersed from said nozzle creating an oil rich atmosphere to lubricate the moving components in the casing.

2. The emergency mist lubrication system of claim 1 wherein said source of air is aircraft engine bleed air.

3. The emergency mist lubrication system of claim 1 wherein the said source of air is an auxiliary air compressor on board an aircraft.

4. The emergency mist lubrication system of claim 1 wherein said air passageway at the other end of said nozzle is an annulus surrounding said orifice of said nozzle.

5. The emergency mist lubrication system of claim 4 wherein said air annulus is sized to permit an air flow of 0.05 pounds per minute.

6. The emergency mist lubrication system of claim 4 wherein said orifice of said nozzle is sized with said annulus to provide a 25 inch$^3$/hour oil flow.

7. The emergency mist lubrication system of claim 1 further comprising:
   a second oil reservoir for holding a supply of lubricating oil; and
   a second oil mist nozzle having an oil passageway formed therethrough for receiving oil from said second oil reservoir at one end and discharging an oil mist at an orifice formed at the opposite end, said nozzle having an air passageway open at one end located at said opposite end of said nozzle and having at the other end a normally closed connection to a source of air, such that when said nozzle is activated by opening said air passageway connection to said source of air, an oil mist is dispersed from said nozzle creating an oil rich atmosphere to lubricate the moving components in the casing.

8. An emergency mist lubrication system to backup a primary lubrication system for lubricating moving components housed within a casing in an aircraft comprising:
   an oil reservoir for holding a supply of lubricating oil;
   means for filling said reservoir from the primary lubrication system during start-up;
   a restrictor for metering the flow of oil from the primary lubrication system to said oil reservoir such that the primary lubrication system does not experience pressure drop during start-up; and an oil mist nozzle located at the bottom of said reservoir and having an oil passageway fed by the oil draining from the oil reservoir and an air passageway activated by a source of air upon a pressure drop on the primary lubrication system to disperse an oil mist creating an oil rich atmosphere to lubricate the moving components in the casing.

9. The emergency mist lubrication system of claim 8 wherein said source of air is aircraft engine bleed.

10. The emergency mist lubrication system of claim 8 wherein the said source of air is an auxiliary air compressor.

11. An emergency mist lubrication system for lubricating moving components housed within a casing, upon the drop of oil pressure in the primary lubrication system in an aircraft comprising:

at least one oil reservoir for holding a supply of lubricating oil;

a means for filling the reservoir from the primary lubrication system;

a restrictor for metering the flow of oil from the primary lubrication system such that the primary lubrication system does not experience pressure drop during start-up; and at least one oil mist nozzle located at the bottom of said reservoir, having an oil passageway formed therethrough for receiving oil draining form said reservoir at one end of said nozzle and for discharging an oil mist at an orifice at the other end of said nozzle, said nozzle having an air passageway open at one end located at said other end of said nozzle and forming an air annulus, and having at the other end a normally closed connection to a source of air, such that when said nozzle is activated by opening said air passageway to the source of air, an oil mist is dispersed from said nozzle creating an oil rich atmosphere to lubricate the moving components in the casing.

12. The emergency mist lubrication system of claim 11 wherein said air annulus is sized to permit an air flow of 0.05 pounds per minute.

13. The emergency mist lubrication system of claim 11 wherein said orifice at the other end of said nozzle is sized with said air annulus to provide a 25 inch$^3$/hour oil flow.

* * * * *

UNITED STATES PATENT AND TRADEMARK OFFICE
CERTIFICATE OF CORRECTION

PATENT NO. : 5,097,926
DATED : March 24, 1992
INVENTOR(S) : Duello

It is certified that error appears in the above-identified patent and that said Letters Patent is hereby corrected as shown below:

Column 5, line 7, delete "on" and insert therefore --in--.

Column 6, line 5, delete "form" and insert therefore --from--.

Signed and Sealed this

Seventeenth Day of August, 1993

Attest:

BRUCE LEHMAN

Attesting Officer

Commissioner of Patents and Trademarks